United States Patent
Carlin

(10) Patent No.: US 7,338,633 B2
(45) Date of Patent: Mar. 4, 2008

(54) METHOD FOR THE APPLICATION OF ANTI-FOULING AGENTS

(75) Inventor: Francesco Carlin, Padua (IT)

(73) Assignee: AKZO Nobel N.V., Arnhem (NL)

( * ) Notice: Subject to any disclaimer, the term of this patent is extended or adjusted under 35 U.S.C. 154(b) by 557 days.

(21) Appl. No.: 10/510,003

(22) PCT Filed: Apr. 11, 2002

(86) PCT No.: PCT/IT02/00230

§ 371 (c)(1),
(2), (4) Date: Sep. 30, 2004

(87) PCT Pub. No.: WO03/085003

PCT Pub. Date: Oct. 16, 2003

(65) Prior Publication Data

US 2005/0118333 A1    Jun. 2, 2005

(51) Int. Cl.
*C23F 11/00* (2006.01)
*C08F 2/00* (2006.01)
(52) U.S. Cl. .......................... 422/7; 526/74
(58) Field of Classification Search .............. 526/74; 422/7
See application file for complete search history.

(56) References Cited

U.S. PATENT DOCUMENTS 4,145,496 A * 3/1979 Weimer et al. ............. 526/62
5,674,953 A 10/1997 Masuko et al.
6,114,476 A * 9/2000 Krishnamurti et al. ........ 526/62
6,174,986 B1 * 1/2001 Nakamura et al. .......... 528/150
6,232,412 B1 * 5/2001 Raspanti et al. ............. 526/74
6,894,125 B2 * 5/2005 Kamata et al. ............... 526/62
2002/0015692 A1 * 2/2002 Krishnamurti et al. ... 424/78.37

FOREIGN PATENT DOCUMENTS

| EP | 0 052 412 B2 | 5/1982 |
| EP | 0 821 008 A2 | 1/1998 |
| EP | 0 942 936 B1 | 9/1999 |
| EP | 1 108 727 A1 | 6/2001 |
| GB | 2 285 447 A | 7/1995 |

OTHER PUBLICATIONS

"Fine Chemicals for PVC/S"; CIRS Spa; Chapter 5, 1999; pp. 64-88.

* cited by examiner

*Primary Examiner*—Walter D. Griffin
*Assistant Examiner*—Lydia Edwards
(74) *Attorney, Agent, or Firm*—Kenyon & Kenyon LLP

(57) ABSTRACT

There is described a method for applying an aqueous solution to the internal walls of a reactor, before the start of the polymerization reaction of vinyl chloride and/or vinyl acetate, which aqueous solution contains a salt of an anti-scaling agent which comprises a product of condensation of an aldehyde, a phenolic compound and an aromatic carboxylic acid hydroxylated at the aromatic nucleus, wherein the pH-value of this aqueous solution is changed, during the application, to a pH-value of less than 5 and, preferably, in the range between 2.5 and 4.5.

16 Claims, 2 Drawing Sheets

METHOD FOR THE APPLICATION OF ANTI-FOULING AGENTS

Figure 1:
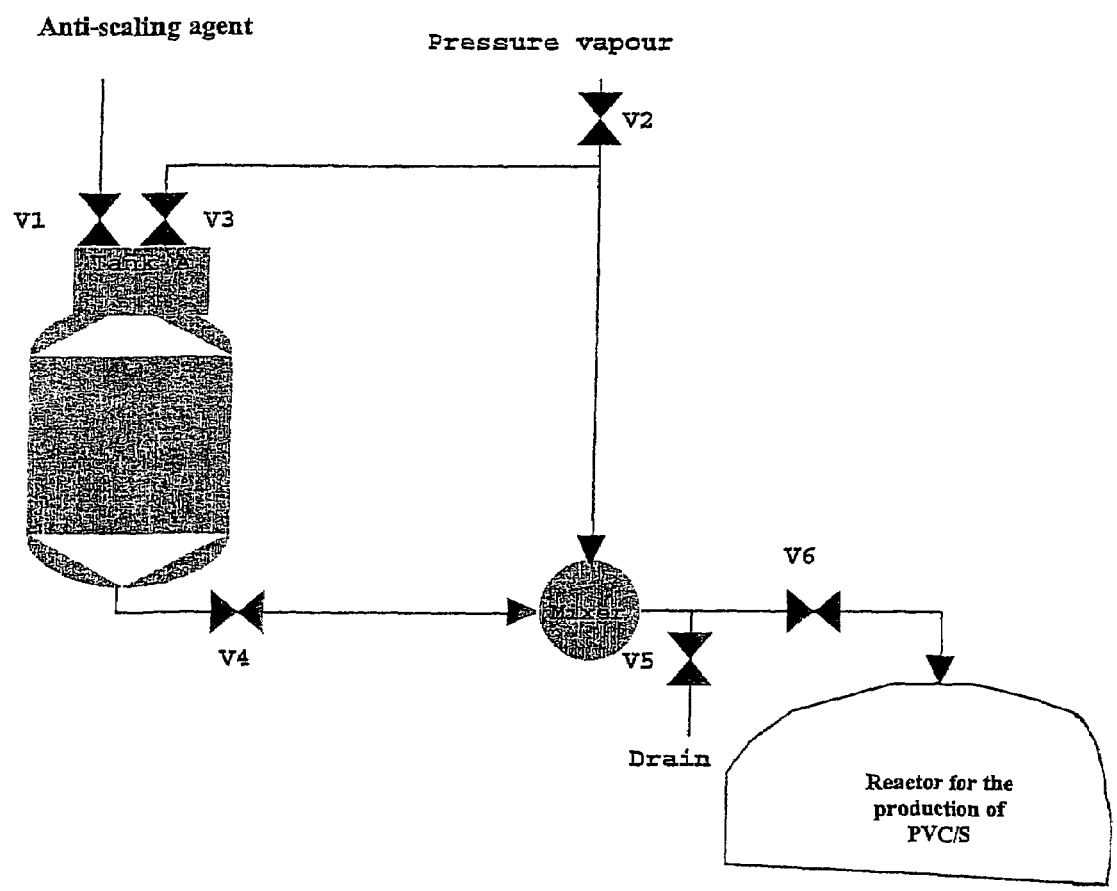

The present invention relates to a method for applying anti-scaling agents used in the polymerization of vinyl chloride, vinyl acetate or mixtures thereof.

PRIOR ART

The anti-scaling agents normally used in the polymerization of vinyl chloride and/or vinyl acetate are products which can be obtained by condensation of formaldehyde and 1-naphthol, such as, for example, those described in European patent application EP-52412. European patent application EP-942936, incorporated herein by reference, describes anti-scaling agents which comprise a product of condensation of an aldehyde, a phenolic compound and an aromatic carboxylic acid hydroxylated at the aromatic nucleus. Preferably the aldehyde is formaldehyde, the phenolic compound is 1-naphthol and the aromatic carboxylic acid hydroxylated at the aromatic nucleus is selected from salicylic acid, 4-hydroxybenzoic acid, α, β, or γ-resorcylic acid, 2,3-dihydroxybenzoic acid, 2,5-dihydroxybenzoic acid, 2-hydroxy-5-methoxybenzoic acid or 6-hydroxy-2-naphthoic acid; of these, the one greatly preferred is β-resorcylic acid (that is, 2,4-dihydroxybenzoic acid).

STATEMENT OF INVENTION

An anti-contaminating agent (or anti-scaling agent), in order to be effective and economically suitable for the production of PVC in suspension (PVC/S), must satisfy the following conditions:
  it must be stable, readily meterable and readily applicable with vapour under pressure (the polymerization reactor must in fact be kept closed in order to avoid very dangerous contaminations owing to the emission of gaseous vinyl chloride);
  it must have an elevated capacity for coagulating rapidly upon variation in the pH-value at the moment when it comes into contact with the vapour (which is normally at a pH-value of 9-10);
  it must be able to form a coagulum having a gelatinous appearance and, if possible, be colourless (to avoid contaminating the finished product).

The coagulum must preferably be of the "tacky gel" type in order to adhere to the internal walls of the reactors and to form a protective film (coating) owing to the action of the heat of the vapour.

The gel deposited on the walls must further be able to penetrate uniformly into the micropores of the surface of the steel in order to prevent the formation of microparticles of PVC which can give rise to the formation of the deposits.

Furthermore, it must not be necessary to heat the internal walls of the reactor in order to promote the formation of the protective film; such an operation would in fact involve a delay in the production cycle; after the application, the protective film must be, among other things, strong enough to allow washing with water (pH-value 7) for the removal from the reactor of contaminating residues; the total application time must finally be as short as possible and require simple apparatuses which ensure-reliable and homogeneous application of the product.

Results of this type are normally achieved by applying, with vapour under pressure, an aqueous solution containing 4-8% by weight anti-contaminating agent, at least 12-18% of which must remain on the internal walls of the reactor in the form of a protective film (such a method is described, for example, in "Fine Chemicals for PVC/S", Chapter 5, 1999, published by CIRS Spa, incorporated herein by reference); the method in question in fact allows extended and economical application cycles whereas mechanical or gas-operated spray apparatuses are not presently capable of achieving the abovementioned objectives.

The present invention relates to a novel method for the application of the anti-scaling agent known as EVERCLEAN® 104NS. The preparation of this anti-scaling agent, currently marketed by the owner 3V Sigma Spa, is described in detail in Example 25 of already-mentioned European patent application EP-942936; it refers to a basic aqueous solution having a brown colour and a pH-value of between 11 and 12.4 (normally 11.54) which, as is known in the art, is applied to the internal walls of the reactors for polymerizing vinyl chloride and/or vinyl acetate by spraying in a vapour stream using an apparatus which is similar to that illustrated in FIG. 1.

However, this application method allows the desired anti-scaling effect to be achieved only in part. In fact, when operating in such conditions, a coagulum which adheres sufficiently to the internal walls of the reactors, thereby forming the necessary protective film, is not obtained; on the contrary, the great majority of the anti-scaling agent applied in this manner (approximately 99%) is collected unchanged at the bottom of the reactor before the start of the polymerization reaction, thus necessitating further applications. It has now been surprisingly found that, by acidifying before application the solution of EVERCLEAN® 104NS to a pH-value of less than 5 and, preferably, in the range between 2.5 and 4.5, there is obtained coagulation of the anti-scaling agent which can therefore be applied with greater effectiveness to the walls of the reactor. The problem addressed by the present invention is therefore to provide a method for applying an aqueous solution containing an alkali metal and/or alkaline earth metal salt, preferably a sodium salt, of an anti-scaling agent comprising a product of condensation of an aldehyde, a phenolic compound and an aromatic carboxylic acid hydroxylated at the aromatic nucleus, characterized in that the pH-value of this aqueous solution is changed to a pH-value of less than 5 and, preferably, in the range between 2.5 and 4.5.

Preferably the aldehyde is formaldehyde, the phenolic compound is 1-naphthol and the aromatic carboxylic acid hydroxylated at the aromatic nucleus is 2,4-dihydroxybenzoic acid; the aqueous solution usually contains 4-8% by weight of the alkali metal and/or alkaline earth metal salt of this anti-scaling agent and has a pH-value in the range between 11 and 12.4.

The method according to the present invention provides for contact on the wall (that is, on the internal walls of the polymerization reactor), or in the mixer, between the solution of the anti-scaling agent and a solution of an organic and/or inorganic acid, for example, citric, oxalic, tartaric, hydrochloric, nitric and/or sulphuric acid, which in the presence of vapour ensure a sufficient reduction in the pH-value to allow the coagulation and the formation of the protective film. This aqueous solution preferably contains from 1 to 10% by weight citric acid, preferably 5%.

According to the greatly preferred embodiment of the present invention, the salt of the anti-scaling agent and the aqueous solution of the organic and/or inorganic acid are mixed with each other before being applied to the internal walls of the polymerization reactor; the mixture of gel and condensate obtained in this manner is applied to the internal walls of the polymerization reactor in a stream of vapour. A suitable apparatus for the application according to the present invention is, for example, illustrated in FIG. 2 (wherein the valves are designated using the letter V). The pressure of the vapour is not binding for the purposes of the present invention and can vary according to the type of installation; the pressures normally used are, however, in the range between approximately 2 and 20 bar; the application time is normally in the range between 15 and 45 seconds.

As will be appreciated from the Examples reproduced below, which must not be taken to limit the present invention, the method claimed here has the advantage of providing the anti-scaling agent corresponding to European patent application EP-942936 in the form of a coagulate product. This product can therefore be readily applied to the internal walls of a reactor for polymerizing vinyl chloride and/or vinyl acetate, thereby forming a protective film which adheres to the walls at a rate greater than 12% by weight relative to the quantity loaded. In this manner, it is thus possible adequately to protect the reactor by eliminating almost completely the formation of deposits even after long periods of activity, thereby minimizing the necessity of interrupting the production cycle to allow the installation to be cleaned; the large quantity of anti-scaling agent which remains attached to the wall further allows a reduction in the quantity of anti-scaling agent to be used, with obvious economic advantages.

EXAMPLES

Example 1

There was loaded into a reactor, measuring 10 m$^3$ with walls of stainless steel, provided with an application apparatus of the type schematically depicted in FIG. 1, 1 kg of an aqueous solution containing 6% by weight sodium salt of the anti-scaling agent which is obtained as described in Example 25 of European patent application EP-942936. The product was sprayed for 30 seconds on the inside of the reactor with vapour at a pressure of 5 atmospheres.

After the application, the condensate was collected at the bottom of the reactor. The condensate was analyzed in order to determine the pH-value and the possible presence of coagulate. The pH-value was 10 and the condensate contained no precipitate gel.

The condensate was further treated once more with hydrochloric acid until a pH-value of 3.8 was reached and there was finally observed a coagulate of dark brown/black appearance which was found to correspond to more than 99% by weight cc the anti-scaling agent initially loaded.

Example 2

Figure 2:
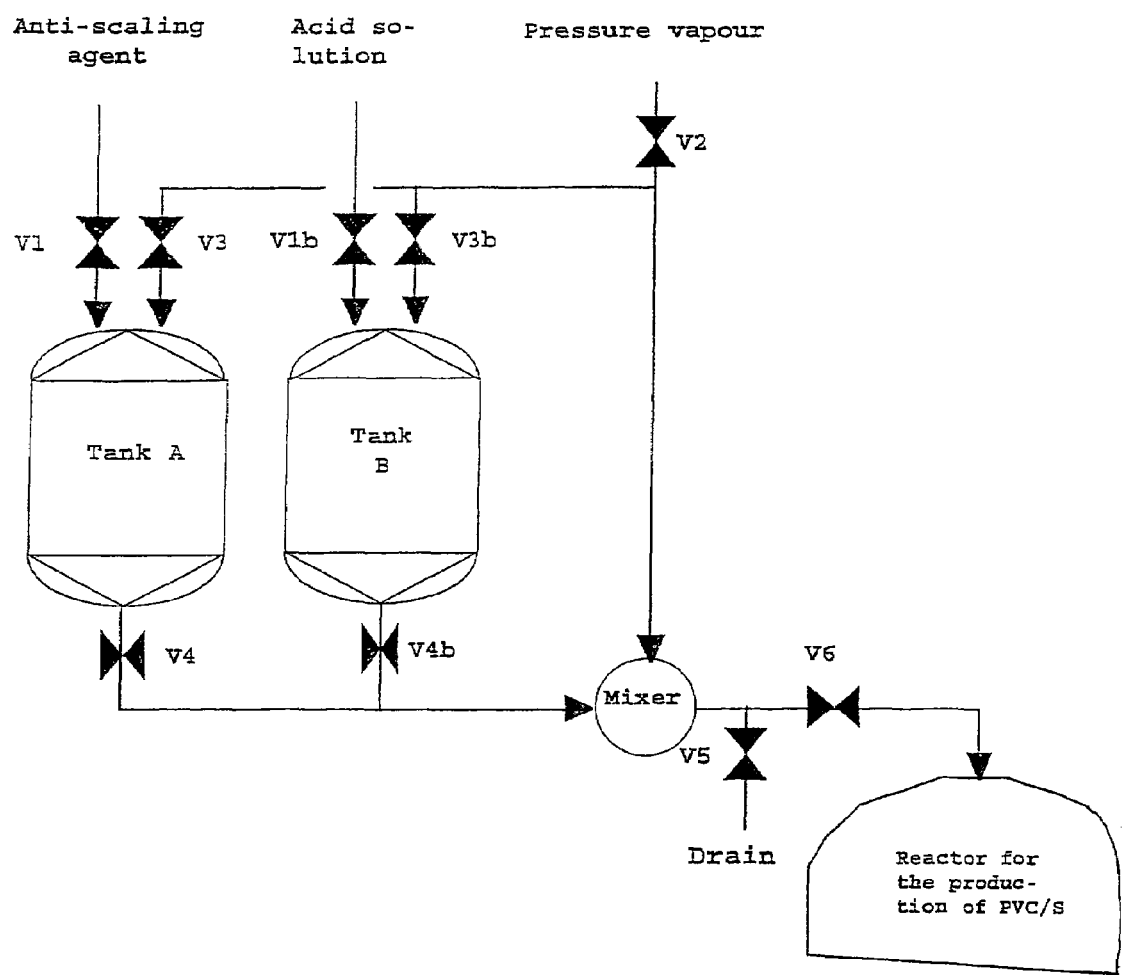

The procedure described in Example 1 was repeated and the apparatus schematically depicted in FIG. 2 was used (wherein 1 liter citric acid at a concentration of 5% by weight was loaded into tank B).

After spraying in the reactor, the condensate was collected and it was observed that the condensate had a pH-value of 3.2 and contained 85% coagulated anti-scaling product (while the remaining 15% was left deposited on the internal walls of the reactor as a protective film).

Examples 3-4

The procedure of Examples 1 and 2 was repeated with similar results when operating with vapour at a pressure of 18 atmospheres.

Examples 5-8

The procedure of Examples 1-4 was repeated with similar results using EVERCLEAN® 104NS, which is commercially available, in place of the product obtained according to Example 25 of European patent application EP-942936.

The invention claimed is:

1. A method for applying an aqueous solution to the internal walls of a reactor for polymerizing vinyl chloride and/or vinyl acetate, which aqueous solution contains a salt of an anti-scaling agent which comprises a product of condensation of an aldehyde, a phenolic compound and an aromatic carboxylic acid hydroxylated at the aromatic nucleus, the method being characterized in that the pH-value of this aqueous solution is changed to a pH-value of less than 5.

2. A method according to claim 1, characterized in that the pH-value of the aqueous solution is changed to a pH-value in the range between 2.5 and 4.5.

3. A method according to claim 1, characterized in that the salt of the anti-scaling agent is an alkali metal and/or alkaline earth metal salt.

4. A method according to claim 1, characterized in that the pH-value is changed to those values by means of acidification with an aqueous solution of an organic and/or inorganic acid.

5. A method according to claim 4, characterized in that the acid is selected from citric, oxalic, tartaric, hydrochloric, nitric, and/or sulphuric acid.

6. A method according to claim 4, characterized in that the aqueous solution contains from 1 to 10% by weight citric acid.

7. A method according to claim 1, characterized in that the aqueous solution which contains the salt of the anti-scaling agent and the aqueous solution of the organic and/or inorganic acid are mixed with each other before the polymerization reaction.

8. A method according to claim 7, characterized in that the aqueous solution which contains the salt of the anti-scaling agent and the aqueous solution of the organic and/or inorganic acid are mixed with each other before being applied to the internal walls of the polymerization reactor.

9. A method according to claim 8, characterized in that the mixture thereby obtained is applied to the internal walls of the polymerization reactor in a stream of vapour.

10. A method according to claim 9, characterized in that the aqueous solution thereby obtained is applied to the internal walls of the polymerization reactor at a pressure in the range between 2 and 20 bar.

11. A method according to claim 10, characterized in that the aqueous solution thereby obtained is applied to the internal walls of the polymerization reactor for a period of time of from 15 to 45 seconds.

12. A method according to claim 7, characterized in that the aqueous solution which contains the salt of the anti-scaling agent and the aqueous solution of the organic and/or inorganic acid are mixed with each other on the wall.

13. A method according to claim 1, characterized in that the aldehyde is formaldehyde, the phenolic compound is 1-naphthol and the aromatic carboxylic acid hydroxylated at the aromatic nucleus is 2,4-dihydroxybenzoic acid.

14. A method according to claim 1, characterized in that the aqueous solution contains 4-8% by weight of the alkali metal and/or alkaline earth metal salt of the anti-scaling agent.

15. A method according to claim 1, characterized in that the aqueous solution has a pH-value in the range between 7 and 12.4.

16. A method according to claim 1, characterized in that the salt of the anti-scaling agent is a sodium salt.

* * * * *